United States Patent
Ryan et al.

(10) Patent No.: US 7,774,574 B2
(45) Date of Patent: Aug. 10, 2010

(54) PROTOTYPING INTEGRATED SYSTEMS

(75) Inventors: Stuart Ryan, Hotwells (GB); Andrew Jones, Redland (GB)

(73) Assignee: STMicroelectronics N.V., Amsterdam (NL)

( * ) Notice: Subject to any disclaimer, the term of this patent is extended or adjusted under 35 U.S.C. 154(b) by 1559 days.

(21) Appl. No.: 10/621,012

(22) Filed: Jul. 15, 2003

(65) Prior Publication Data

US 2005/0015565 A1  Jan. 20, 2005

(51) Int. Cl.
G06F 12/06 (2006.01)
(52) U.S. Cl. .................................... 711/202
(58) Field of Classification Search ............... None
See application file for complete search history.

(56) References Cited

U.S. PATENT DOCUMENTS 4,626,985 A * 12/1986 Briggs .................... 712/40
6,907,514 B2 * 6/2005 Mitsuishi ................ 712/38

* cited by examiner

Primary Examiner—Denise Tran
(74) Attorney, Agent, or Firm—Lisa K. Jorgenson; William A. Munck

(57) ABSTRACT

A prototype system having an integrated circuit including an on-chip processor and an on-chip router connected to off-chip resources via an interface. A request directing unit on the chip receives memory access requests and directs them in accordance with either one of two address maps. In one of the address maps, a first range of addresses is allocated to at least one on-chip resource and a second range of addresses is allocated to the interface. In the other memory address map, the first range of addresses is also allocated to the interface. An integrated circuit including such a request directing unit is also described, together with a method for evaluating a prototype system.

17 Claims, 4 Drawing Sheets

| valid | eop | be | data | addr. | tid | src | opc | lck |

FIG. 2

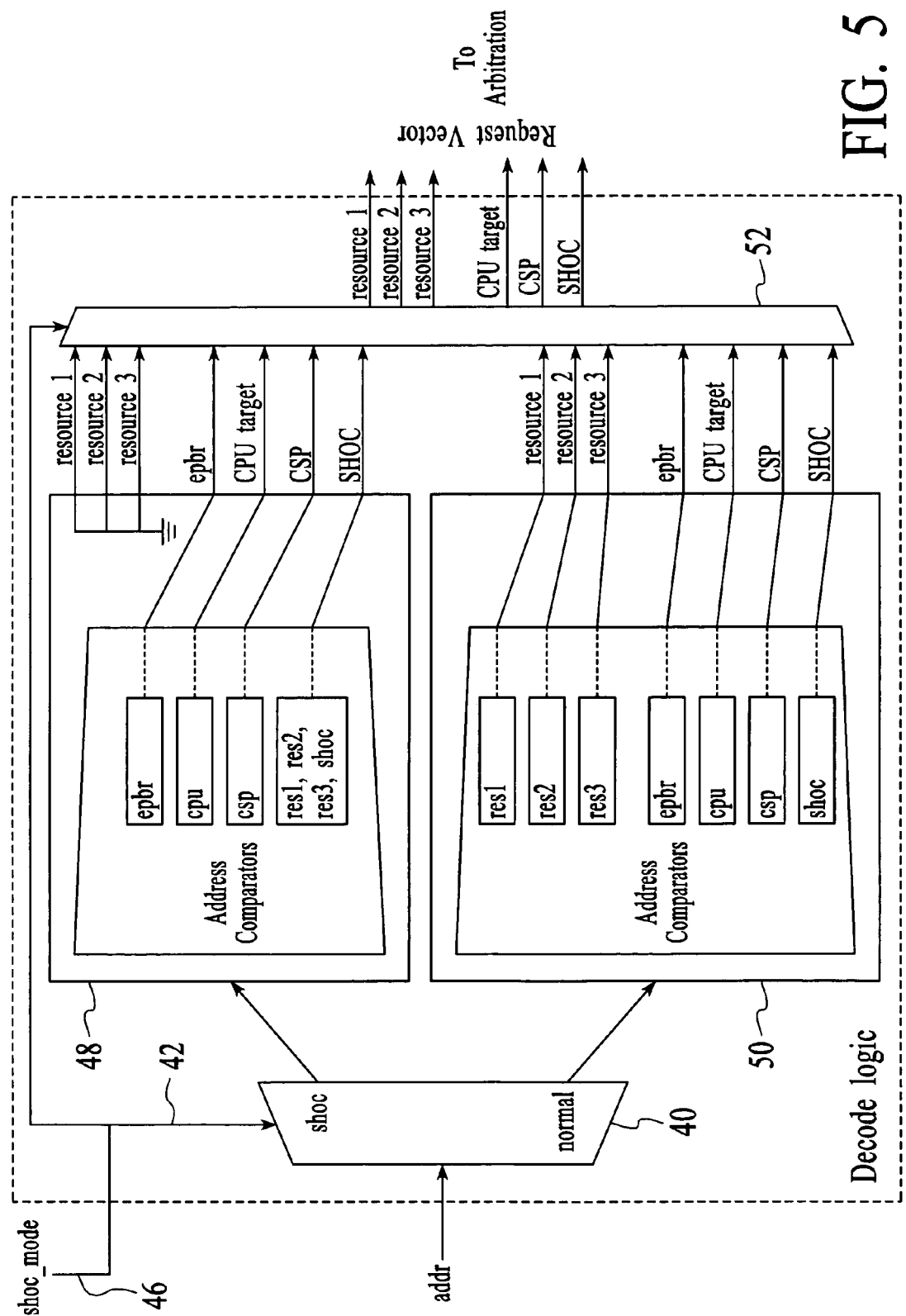

PROTOTYPING INTEGRATED SYSTEMS

FIELD OF THE INVENTION

The present invention relates to prototyping of integrated systems.

BACKGROUND TO THE INVENTION

To prototype a system it is convenient to have a processor on-chip running at its normal speed, and the logic or other off-chip resources which are ultimately to be integrated onto the chip as an off-chip circuit for prototyping purposes. The off-chip circuit can be for example in the form of an FPGA or emulator and can provide memory resources.

Currently, this involves either bonding-out the processor core so that its signals are available off-chip or using one of the existing off-chip communication ports which are already provided on the chip on which the processor is situated. Such ports are generally serial ports or reduced pin-out ports such as debug ports, and in any event are not provided as dedicated ports for prototyping but have some already existing function.

In a situation where the processor core is bonded-out, there are a number of problems. In the first place, bonding-out of a processor's on-chip interface uses a lot of pins. The processor has to be run at a reduced speed in order for the bond-out interface to function reliably. The limitation on the use of pins means that it is difficult to support platform prototyping where some resources are integrated on-chip and some are not.

Where an existing off-chip communication port is used, there are also difficulties. Many such ports require software assistance to function. This software is not required in the integrated system which is under prototype, which means that the prototype software in the final software will have to be different. In effect, the final software cannot run on the prototype and therefore any testing of the prototype cannot completely match the final product.

Many such ports have an address map footprint which implies that the prototype address map is different from the final integrated address map. This also means that the final software cannot run on the prototype.

SUMMARY OF THE INVENTION

According to one aspect of the invention there is provided an integrated circuit comprising: a processor operable to issue memory access requests, each memory access request identifying an address in memory to which the request is directed; at least one on-chip resource falling within the address space addressable by the processor; an interface for directing packets off-chip and addressable within the address space of the processor; and a request directing unit for receiving said memory access requests and directing them in accordance with a selected one of first and second address maps, wherein said first address map has a first range of addresses allocated to said at least one on-chip resource and a second range of addresses allocated to said interface, and in said second memory address map said first range of addresses are also allocated to the interface.

According to another aspect of the invention there is provided a prototype system comprising an integrated circuit comprising: a processor operable to issue memory access requests, each memory access request identifying an address in memory to which the request is directed; at least one on-chip memory resource falling within the address space addressable by the processor; an interface for directing packets off-chip and addressable within the address space of the processor; a request directing unit for receiving said memory access requests and directing them in accordance with a selected one of first and second address maps, wherein said first address map has a first range of addresses allocated to said at least one memory resource and a second range of addresses allocated to said interface, and the second memory address map said first range of addresses are also allocated to the interface; and an off-chip circuit connected to said interface and including at least one off-chip memory resource.

According to another aspect of the invention there is provided a method of evaluating a prototype system comprising an integrated circuit including an on-chip processor associated with at least one on-chip memory resource and an off-chip circuit associated with at least one off-chip memory resource, the method comprising: executing a computer program on the on-chip processor, said program causing the generation of memory access requests, each memory access request including an address identifying an address in memory to which the request is directed; and in accordance with a selected mode of operation, selectively supplying said memory access requests to at least one of said first and second memory address maps, and directing the memory access requests selectively to said on-chip memory resource or said off-chip circuit in dependence on the selected one of said first and second address maps.

For a better understanding of the present invention and so show how the same may be carried into effect, reference will now be made by way of example to the accompanying drawings.

BRIEF DESCRIPTION OF THE DRAWINGS

FIG. 2 shows a memory access packet;

FIG. 5 shows the decode logic of the memory management unit.

DESCRIPTION OF THE PREFERRED EMBODIMENT

Figure 1:
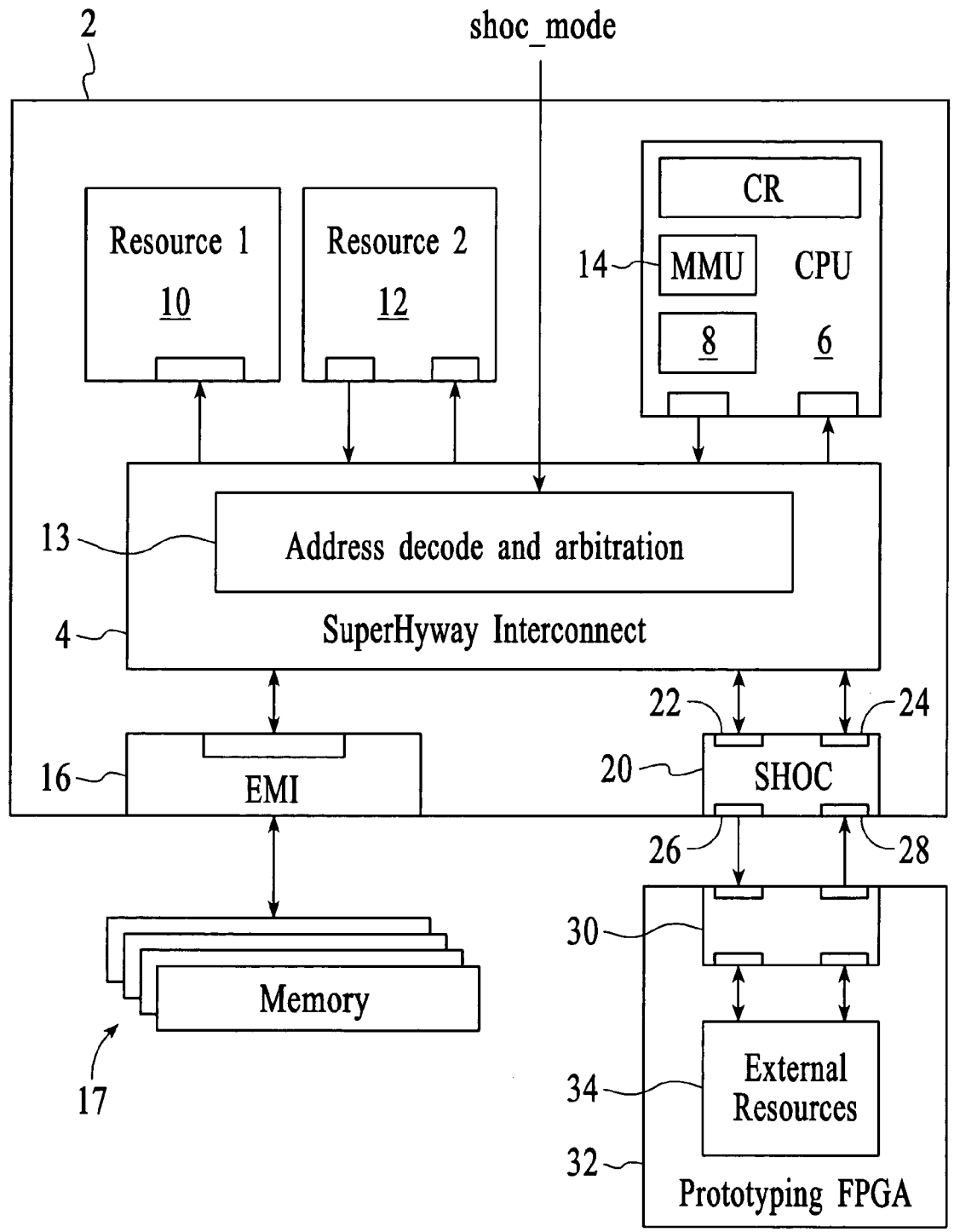
FIG. 1 is a schematic diagram of an integrated system.

FIG. 1 is a schematic diagram of a system to be prototyped. The system comprises an integrated circuit in the form of chip 2 on which is implemented a communication path 4 which takes the form of a packet router. The described embodiment implements a SuperHyway interconnect, but the present invention can be applied to any form of bus architecture.

The router 4 is connected to a CPU 6 and to a plurality of other functional modules. The CPU 6 has a cache memory 8, a memory management unit MMU 14 and control registers CR.

There are a plurality of resource modules 10, 12 of which only two (Resource1, Resource2) are shown, though it will be appreciated that there may be any number of resource modules. Each resource module is a memory mapped peripheral, e.g. a graphics block, direct memory access (DMA) or other memory access module. As an example of a memory access module, there is illustrated an external memory interface EMI 16 connected to off-chip memory devices 17. Other memory access modules, such as FEMI (Flash EMI) may also be present. It will be appreciated that there will be other functional modules and possibly including other processor modules connected to the router 4. Some of those modules are referred to later but are not shown in FIG. 1.

Each module includes control registers CR associated with that particular module. The chip 2 also includes ports (not shown) connected to the router 4, e.g. peripheral bridge ePBR etc. In addition the integrated circuit 2 includes a SuperHyway off-chip (SHOC) interface 20. The interface 20 has first and second wide bi-directional ports 22, 24 connected to the router 4 on the circuit-side of the interface 20 and first and second narrow off-chip ports which are unidirectional, outgoing being referenced 26 and incoming being referenced 28. The interface 20 communicates with a similar interface 30 on an off-chip circuit 32 which forms part of the system under prototype and which includes off-chip resources 34.

The off-chip resources 34 can include off-chip memory, control registers or any other resources.

The bi-directional wide ports 22, 24 are high pin-out ports which are capable of transmitting packets between the router 4 and the interface 20. The off-chip unidirectional ports 26 and 28 are each narrower in the sense that they have a smaller number of pins to allow off-chip communication. Communication over the router 4 is in the form of packets which in the described embodiment have a maximum length of 32 bytes. The interface 20 is capable of performing a chop and frame function on packets received from the router 4 for transmission off-chip so as to transmit the packet off-chip in a plurality of chunks via the off-chip communication path attached to the port 26. Conversely, the interface can reassemble chunks which are received on the incoming data path attached to port 28 into packets for communication on the router 4. The precise semantics of the interface 20 do not form part of the present invention and so are not discussed further herein. The invention can be implemented with any suitable form of off-chip port.

Figure 2:
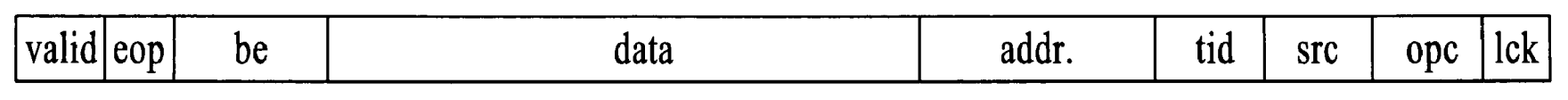

Memory access requests are issued by the CPU 6 in the form of packets. An example packet is shown in FIG. 2 which represents a memory access request packet. The packet comprises a lock field lck, opcode field opc, source field src, transaction identifier field tid, address field addr, data field DATA, byte enable field be, end of packet field eop and a valid bit VALID. The important field to note herein is the address field which can be 4 bytes long and which identifies an address in memory to which the memory access requests relate. The opcode field opc identifies the memory operation, for example whether the memory access request is a read or write. If it is a write request, data is correspondingly sent in the packet. The address in the packet is interpreted by decode logic and arbitration logic 13 forming part of the router 4. The decode logic is responsible for reading the address and comparing the address with predetermined address ranges which identify to which module the packets should be sent. The decode logic can operate in two modes. The first mode is termed platform mode and allocates the address space addressable by the address field addr in the memory access request packet across the on-chip memory resources 16, 18, 10, 12. In addition, part of the address space is reserved for the SHOC interface 20 to allow certain packets to be dispatched off-chip.

In the second mode, referred to as bond-out mode, the entire address space is mapped off-chip via the SHOC interface 20. In this way, all memory access requests are directed off-chip and so all non-CPU resources are off-chip.

This allows two prototyping modes to be used depending on the nature of the system being developed, while utilising the same evaluation chip 2. Platform mode allows a customer to preserve the address map of the evaluation chip 1, and integrate their IP only into the memory space occupied by the SHOC port while bond-out mode allows the user to decide to use the evaluation chip 2 only as a CPU core, using the entire memory space for their own IP.

Figures 3, 4:
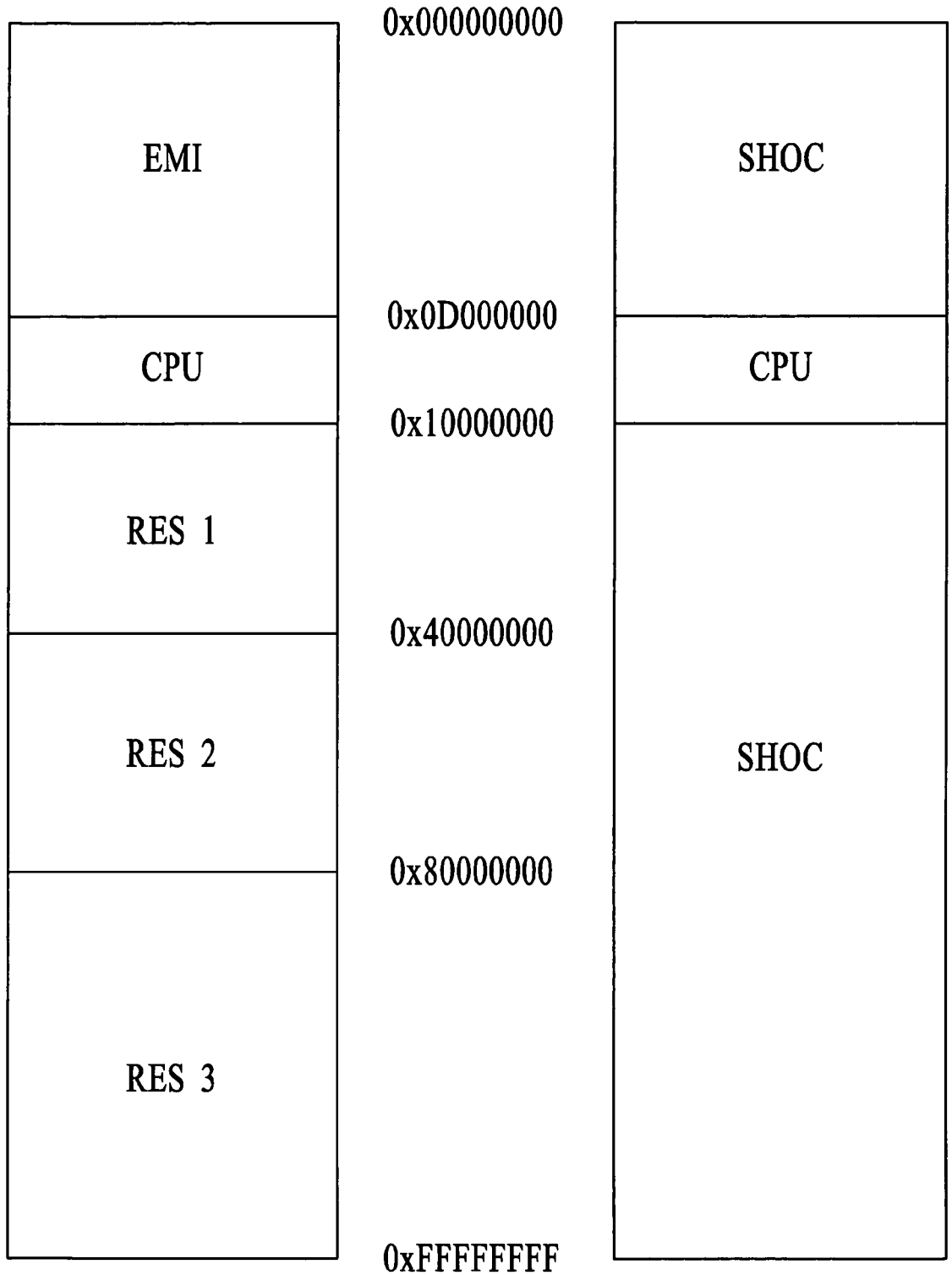
FIG. 3 shows the addressing configuration of a first address map.
FIG. 4 shows the addressing configuration of a second address map.

FIGS. 3 and 4 show examples for the memory maps in platform mode and bond-out mode respectively. In platform mode, the memory space is mapped as follows.

0x00 ... EMI
0x0D0 ... CPU
0x10 ... Res1
0x40 ... Res2
0x80 ... Res3 (not shown)

In each case, the address given above is the beginning address of the mapped region for the particular resource in question. The address space illustrated in FIG. 3 is 0x00 ... to 0xFF ...

FIG. 4 shows how the address space is mapped in bond-out mode. In FIG. 4, the 29 bit space is mapped only to the SHOC interface 20 and the CPU. The EMI 16, Resource1 10, Resource2 12 and Resource 3 (not shown) no longer have their own addresses, so that packets which would formerly have been sent to them are instead transmitted to the SHOC interface 20 and are sent off-chip. Although not illustrated, it will be appreciated that the control registers accessible in the CPU are also addressable. In the address map for platform mode, the CPU addresses include addresses of control registers associated with the on-chip resource.

The manner in which this altered mapping is implemented will now be explained with reference to FIG. 5 which illustrates the decode logic in the router 4. The address field addr is supplied to a multiplexer 40 which is controlled responsive to a mode signal on line 42. This mode signal can be implemented in any suitable way, but in particular can be taken out to a mode pin 46 shoc_mode on the chip which can be set to logic zero or logic one on power-up therefore to determine the memory address mode of the system under prototype. The decode logic includes an address map 48 for bond-out mode and an address map 50 for platform mode. According to the address map 50, each of the address ranges against which the incoming address field addr is compared are mapped according to the mapping of FIG. 3. Thus, there are address ranges for each resource Res1, Res2, Res3, the ePBR, the CPU and the SHOC part. In addition there is an address range associated with Core Support Peripherals (CSP) which are memory mapped to a target port belonging to the CPU but are nevertheless visible to other modules on the router 4. The address map 48 maps these ranges in accordance with the address map of FIG. 4. In particular in the address map 48, there is a single address range including addresses for the various on-chip resources Res1, Res2, Res3, and the SHOC interface 20. Note however that the ePBR, CPU and CSP remain individually mappable ports. A request vector is generated by the comparators in the operative one of the address maps 48, 50 and is output via an output multiplexer 52 also controlled by the mode signal on the mode pin 46. The request vector indicates to a system arbiter (not shown) that a request packet for a particular target is pending, and the arbiter routes the packet to the target if the target is available while indicating to other modules connected to the router 4 that the request packet is not for them. Note that in platform mode using address map 50, packets may be routed to the on-chip resources 10, 12, Resource1, Resource2 etc, whereas using the address map 48 of bond-out mode addresses which would have been directed to these resources are now directed to the SHOC interface 20.

It will be appreciated that a similar mapping technique to that described above could be used for routing response packets back to the initiator module that made the associated request. That is, in platform mode, the router directs responses to requests made from initiators on-chip (including the CPU) and initiators behind the SHOC interface 20. In bond-out mode, responses made to the CPU are routed back to either the CPU initiator or to an initiator off-chip via the SHOC interface 20.

What is claimed is:

1. An integrated circuit comprising:
a processor operable to issue memory access requests, each memory access request identifying an address in memory to which the request is directed;
at least one on-chip resource falling within the address space addressable by the processor;
an interface for directing packets off-chip and addressable within the address space of the processor; and
a request directing unit for receiving said memory access requests and directing them in accordance with a selected one of first and second address maps,
wherein said first address map has a first range of addresses allocated to said at least one on-chip resource and a second range of addresses allocated to said interface, and in said second memory address map said first range of addresses are also allocated to the interface, and
wherein said interface comprises at least one chip-side port for transmitting memory access requests in parallel across a plurality of pins, and first and second circuit-side ports each with a reduced number of pins for communicating said packets off-chip.

2. An integrated circuit according to claim 1, which comprises a mode setting pin for selectively setting a first mode in which said first address map is utilized and a second mode in which said second address map is utilized.

3. An integrated circuit according to claim 2, wherein said mode is set by application of a logic value selected from one and zero on the mode setting pin.

4. An integrated circuit according to claim 1, wherein said request directing unit comprises switching means responsive to a mode setting signal for selectively directing the memory access request to one of said first and second address maps.

5. An integrated circuit according to claim 4, wherein said switching means comprises a multiplexer.

6. An integrated circuit according to claim 1, wherein said at least one on-chip resource comprises a memory mapped peripheral.

7. An integrated circuit according to claim 1, wherein said at least one on-chip resource comprises a memory access device connectable to an off-chip memory resource.

8. An integrated circuit according to claim 1, wherein said interface comprises circuitry for chopping a packet transmitted on the chip-side port into chunks so as to be transmitted in a plurality of cycles on the reduced number of pins on the first circuit-side port.

9. An integrated circuit according to claim 8, wherein the interface further comprises circuitry for reassembling chunks received in a plurality of cycles on said set of pins at said second circuit-side port into a single packet for transmission via said at least one chip-side port.

10. An integrated circuit comprising:
a processor operable to issue memory access requests, each memory access request identifying an address in memory to which the request is directed;
at least one on-chip resource falling within the address space addressable by the processor;
an interface for directing packets off-chip and addressable within the address space of the processor; and
a request directing unit for receiving said memory access requests and directing them in accordance with a selected one of first and second address maps,
wherein said first address map has a first range of addresses allocated to said at least one on-chip resource and a second range of addresses allocated to said interface, and in said second memory address map said first range of addresses are also allocated to the interface, which comprises control registers addressable in said memory space, wherein in said first memory address map said first range of addresses include addresses of control registers associated with said at least one resource and in said second address map said addresses are reallocated to control registers associated with the interface.

11. A prototype system comprising an integrated circuit comprising:
a processor operable to issue memory access requests, each memory access request identifying an address in memory to which the request is directed;
at least one on-chip resource falling within the address space addressable by the processor;
an interface for directing packets off-chip and addressable within the address space of the, processor;
a request directing unit for receiving said memory access requests and directing them in accordance with a selected one of first and second address maps, wherein said first address map has a first range of addresses allocated to said at least one on-chip resource and a second range of addresses allocated to said interface, and in the second memory address map said first range of addresses are also allocated to the interface; and
an off-chip circuit connected to said interface and including at least one off-chip memory resource, wherein said interface comprises at least one chip-side port for transmitting memory access requests in parallel across a plurality of pins and first and second circuit-side ports each with a reduced number of pins for communicating said packets off-chip.

12. A prototype system according to claim 11, which comprises a mode setting pin operatively connected to the request directing unit for selectively setting a first mode in which said first address map is utilized and a second mode in which said second address map is utilized.

13. A prototype system according to claim 11, wherein said request directing unit comprises switching circuitry responsive to a mode setting signal for selectively directing the memory access request to one of said first and second address maps.

14. A prototype system according to claim 11, wherein said at least one on-chip resource comprises a memory mapped peripheral.

15. A prototype system according to claim 11, wherein said at least one on-chip resource comprises a memory access device connectable to an off-chip memory resource.

16. A prototype system according to claim 11, wherein said interface comprises circuitry for chopping a packet transmitted on the chip-side port into chunks so as to be transmitted in a plurality of cycles on the reduced number of pins on the first circuit-side port.

17. A prototype system according to claim 11, wherein the interface further comprises circuitry for reassembling chunks received in a plurality of cycles on said set of pins at said second circuit-side port into a single packet for transmission via said at least one chip-side port.

* * * * *

UNITED STATES PATENT AND TRADEMARK OFFICE
CERTIFICATE OF CORRECTION

| | | |
|---|---|---|
| PATENT NO. | : 7,774,574 B2 | Page 1 of 1 |
| APPLICATION NO. | : 10/621012 | |
| DATED | : August 10, 2010 | |
| INVENTOR(S) | : Ryan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1782 days.

Signed and Sealed this
Fourth Day of January, 2011

David J. Kappos
*Director of the United States Patent and Trademark Office*